(12) United States Patent
Pitchford

(10) Patent No.: US 7,647,872 B2
(45) Date of Patent: Jan. 19, 2010

(54) FOLDING, AUTO-LEVELING EXTENSION TABLE

(76) Inventor: Gary Lee Pitchford, 130 Brookside La., Galena, MO (US) 65656

(*) Notice: Subject to any disclaimer, the term of this patent is extended or adjusted under 35 U.S.C. 154(b) by 0 days.

(21) Appl. No.: 11/804,761

(22) Filed: May 21, 2007

(65) Prior Publication Data
US 2008/0289543 A1 Nov. 27, 2008

(51) Int. Cl.
A47B 5/00 (2006.01)
(52) U.S. Cl. .............................. 108/48; 108/9
(58) Field of Classification Search ............... 108/77, 108/78, 79, 80, 81, 82, 9, 10, 42, 48, 152; 248/277.1
See application file for complete search history.

(56) References Cited

U.S. PATENT DOCUMENTS

| | | | |
|---|---|---|---|
| 1,583,879 A | 5/1926 | Hallock | |
| 1,864,840 A | 6/1932 | Lehner | |
| 2,555,217 A | 5/1951 | Young | |
| 2,579,783 A * | 12/1951 | Branto | 5/617 |
| 2,760,617 A * | 8/1956 | Bowen | 193/35 TE |
| 2,784,004 A * | 3/1957 | Hamrick, Jr. | 108/48 |
| 2,877,073 A * | 3/1959 | Malmer | 108/9 |
| 4,068,551 A | 1/1978 | Kreitz | |
| 4,341,247 A * | 7/1982 | Price | 144/287 |
| 4,393,969 A * | 7/1983 | Woell | 193/35 TE |
| 4,726,405 A * | 2/1988 | Bassett | 144/287 |
| 4,830,076 A | 5/1989 | Feyer | |
| 4,934,423 A * | 6/1990 | Withrow | 144/286.1 |
| 5,105,862 A | 4/1992 | Skinner | |
| 5,255,724 A | 10/1993 | Butke | |
| 5,282,679 A * | 2/1994 | Redelinghuys | 108/48 |
| 6,047,750 A * | 4/2000 | Jensen | 144/286.1 |
| 6,161,486 A * | 12/2000 | Boots | 108/48 |
| 6,491,071 B1 | 12/2002 | Canfield | |
| 6,786,162 B1 * | 9/2004 | Volkmer et al. | 108/48 |
| 6,978,721 B2 * | 12/2005 | Myers | 108/48 |

* cited by examiner

Primary Examiner—José V Chen
(74) Attorney, Agent, or Firm—Lathrop & Gage L.C.; Joseph L Johnson

(57) ABSTRACT

An extension table apparatus with automatic height adjustment and folding capability. This apparatus is primarily designed for use with portable or stationary frame-mounted woodworking equipment such as planers, joiners, drum sanders and power saws. With one end of the table attached to a height-adjustable surface such as a planer bed, the apparatus uses a leveling assembly extending beneath the table to support and maintain the other end of the table. Simple lever principles and strategically located pivot points keep the table coplanar with the planer bed as it is raised or lowered. The leveling assembly transfers most of the weight of the workpiece and table to the floor, instead of the machine. The apparatus attaches only to the machine permitting mobility of the apparatus and machine. The design of mounting brackets, length of parts and pivoting action allows folding of the apparatus to facilitate storage.

5 Claims, 5 Drawing Sheets

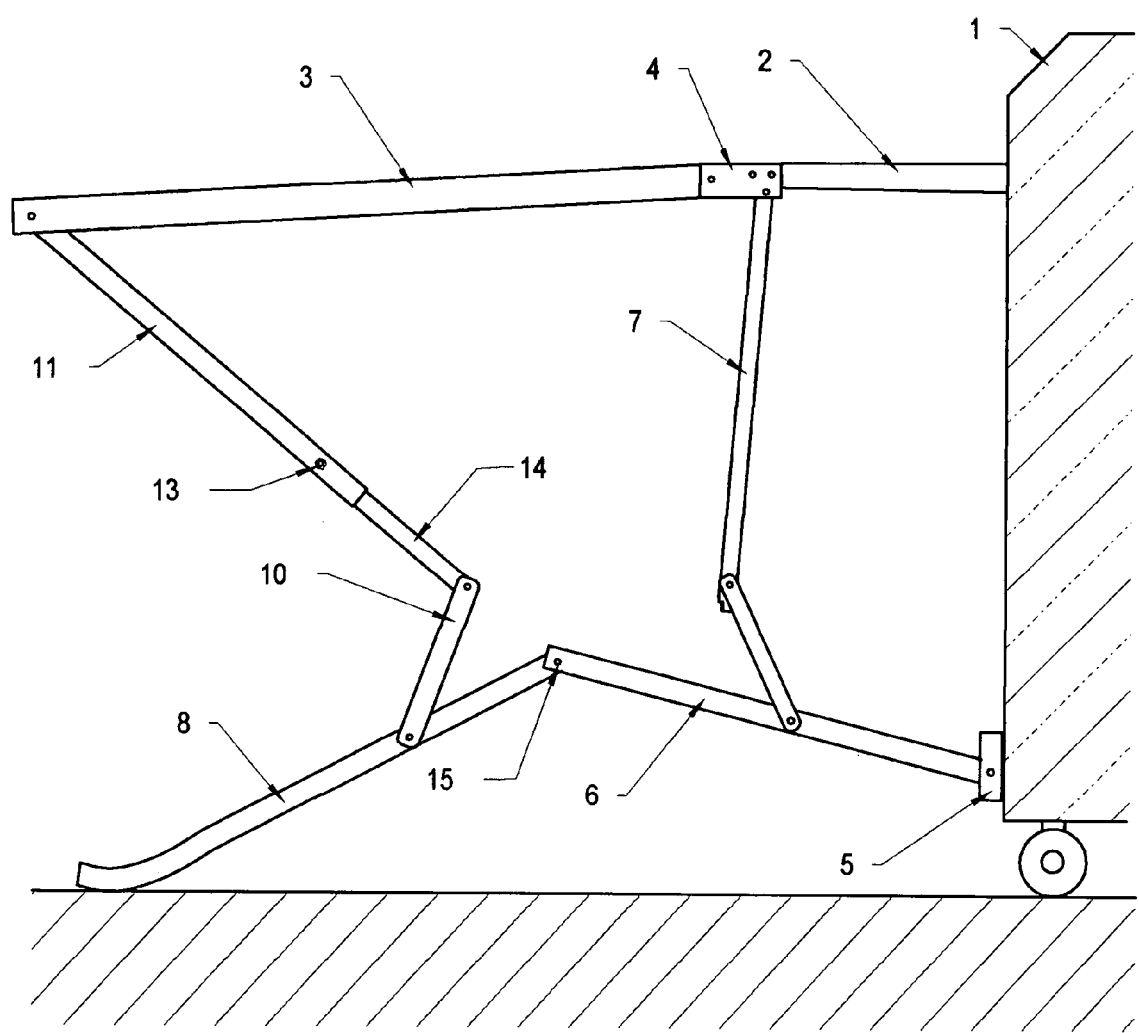
(FIG 4)

(FIG 5)
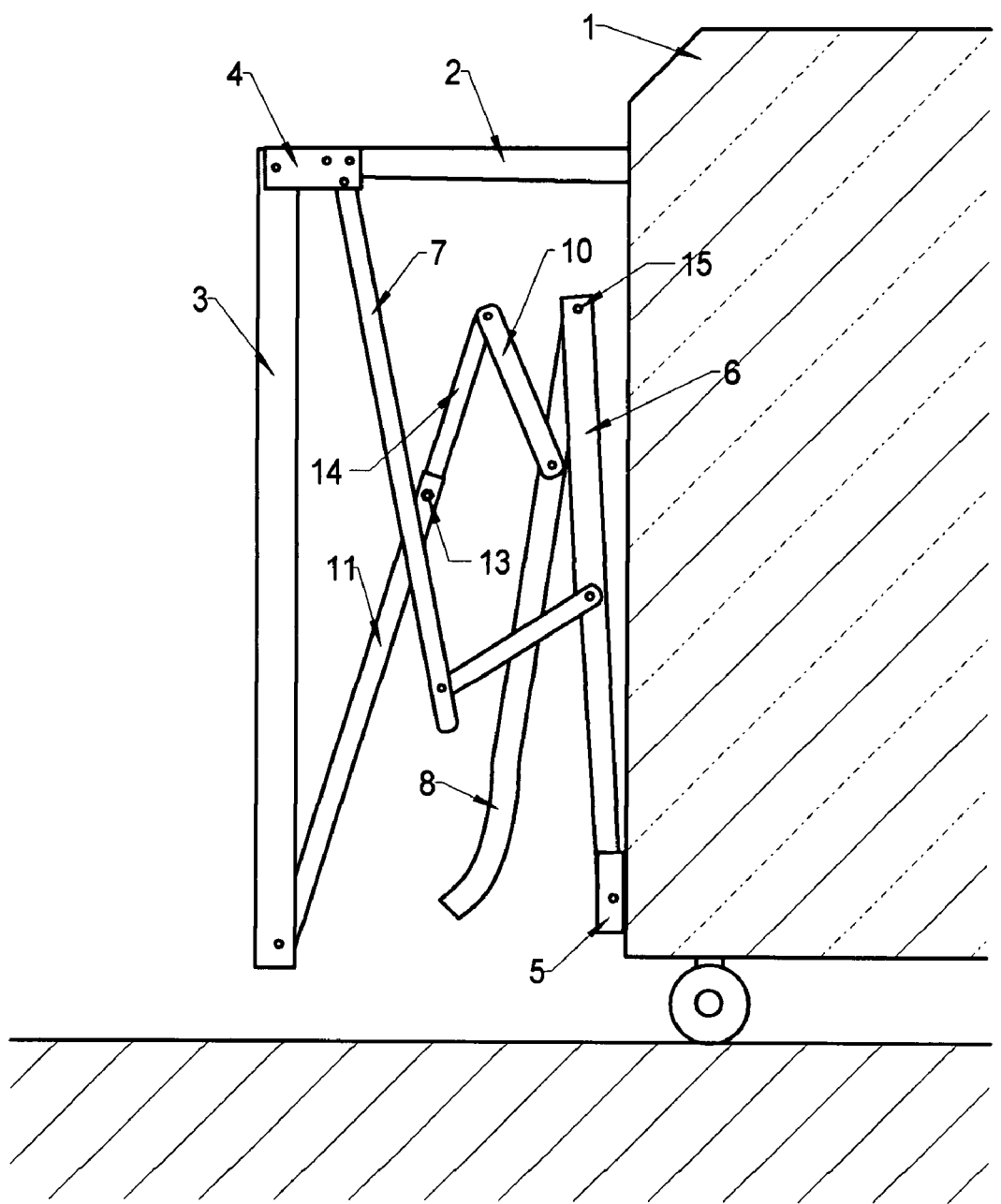

FOLDING, AUTO-LEVELING EXTENSION TABLE

BACKGROUND OF THE INVENTION

In a variety of industrial situations, machines perform operations on workpieces too long and/or heavy for the machine to support by itself. For example, in the woodworking industry, when a long piece of lumber is passed through a planer or through a table saw, some type of supplemental support is often used. A variety of stands such as roller stands and roller tables are available to meet this need. However, these devices pose a number of problems.

One major problem addressed in prior art is the instability of most supplemental support devices in that they are frequently moved out of position by the workpiece. A number of inventions have dealt with this problem by developing extension supports which attach directly to the machine's work surface. Lehner, U.S. Pat. No. 1,864,840 in 1932, developed an adjustable extension stock support with both horizontal and vertical adjustments which attach directly to the machine's work surface. Skinner in U.S. Pat. No. 5,105,862, April 1992, patented an extension table mainly for a miter saw with an adjustable leg making it attachable to tools with different height or even to an adjustable-height surface. However, the leg, an adjustable telescoping leg, required manual adjustment.

A number of machines including the frame mounted planer, have work surfaces with adjustable-height. This creates an additional problem for extension tables. In order for the extension table to function properly, its height must continually be adjusted each time the work surface height is changed. To address this problem, a number of automatically adjusting extension tables are found in prior art. In 1926, Hallock, U.S. Pat. No. 1,583,879, patented an auxiliary supporting table which raised and lowered simultaneously with the planer bed. Hallock's design used wedge shaped members moved by a jack screw and extension rod to change the planer bed height and the extension table height simultaneously. In May 1989, Feyer received a patent, U.S. Pat. No. 4,830,876, for an automatically adjusting extension table used with a bench type planer, Feyer's design, like Hallock's, used moveable wedge shaped bodies, one siding under the other, to raise or lower the outer end of the extension table with the proximal end attached solidly to the planer bed.

Canfield, in U.S. Pat. No. 6,491,071, December 2002, disclosed a height adjustable extension table with proximal end rigidly attached to a height adjustable planer bed with the distal end being supported by a two part leg, hinged in the middle, and being pulled by a cable passing through a pulley to raise or lower the planer bed. While these cited examples provide methods for automatically adjusting the height of the extension table, all three require the table to be rigidly mounted to the machine. Both Feyer and Canfield require part of the apparatus to be attached to the floor or bench making the machine and extension table completely immobile.

The problem of mobility of shop equipment has become an issue of increasing importance. In recent years, frame mounted planers capable of heavy duty operation are mounted on a mobile base to allow the machine to be moved to a needed location or out of the way when not in use. In U.S. Pat. No. 5,255,724, October 1993, Butke addressed the need for extension tables to be attached only to the machine so mobility would not be decreased. He developed an extension table for joiners with both the extension table and supporting member attached only to the machine.

Another need addressed in prior art is the extension table being foldable or easily removed to facilitate storage. In U.S. Pat. No. 2,555,217, Young disclosed a foldable extension table which easily detaches using thumb screws. Kreitz, in U.S. Pat. No. 4,068,551, January 1978, revealed an extension table which is easily removed and folded for storage. Both Kreitz and Young developed extension tables mainly for power saws such as table saws and radial saws. While these extension tables provide for mobility and/or folding for storage, they lacked the ability to automatically adjust to changing height of the surface to which they were attached. Also, in the Butke, Young, and Krietz designs, the machine itself must completely support the weight of the extension table and workpiece.

BRIEF SUMMARY OF THE INVENTION

The present invention provides an extension table apparatus with automatic height adjustment and folding capability which may be attached to a variety of machine work surfaces including surfaces with adjustable height. The apparatus consists of an extended surface, one end of which pivotally attaches to a work surface of a machine to which extended support is needed, a leveling assembly which attaches to the base of the machine and extends beneath the table, providing the leveling for the distal end of the table, and a leg assembly which connects the distal end of the table to the leveling assembly. This extension table apparatus, differing substantially from the devices of similar purpose found in prior art, contains specifically designed components, which work together to accomplish the objectives sought by the inventor. While some of these objectives have individually been addressed in prior art, the present invention utilizes superior design and simplified principles to collectively accomplish the following objectives:

Objectives:
1. The main objective of my invention is to provide an extended supplemental support surface whose height adjusts automatically, remaining in the same plane with the adjustable surface to which it is attached as it moves up or down.
2. A second objective is to develop a supplemental support surface which transfers most of the weight of the work piece to the floor or base surface.
3. Another objective of my invention is to design simple, structurally stable components, which are light weight and mobile requiring no other attachment than to the machine itself.
4. Another objective of my invention is to provide an extension table with folding capabilities, in order to reduce storage space for the apparatus.
5. Another objective of my invention is to design components for the extension table apparatus which can be manufactured economically using preformed materials when possible.

BRIEF DESCRIPTION OF THE SEVERAL VIEWS OF THE DRAWING

FIG. 4 demonstrates the first action in the folding procedure.

FIG. 5 shows the apparatus in its folded position.

DETAILED DESCRIPTION OF THE INVENTION

Figure 1:
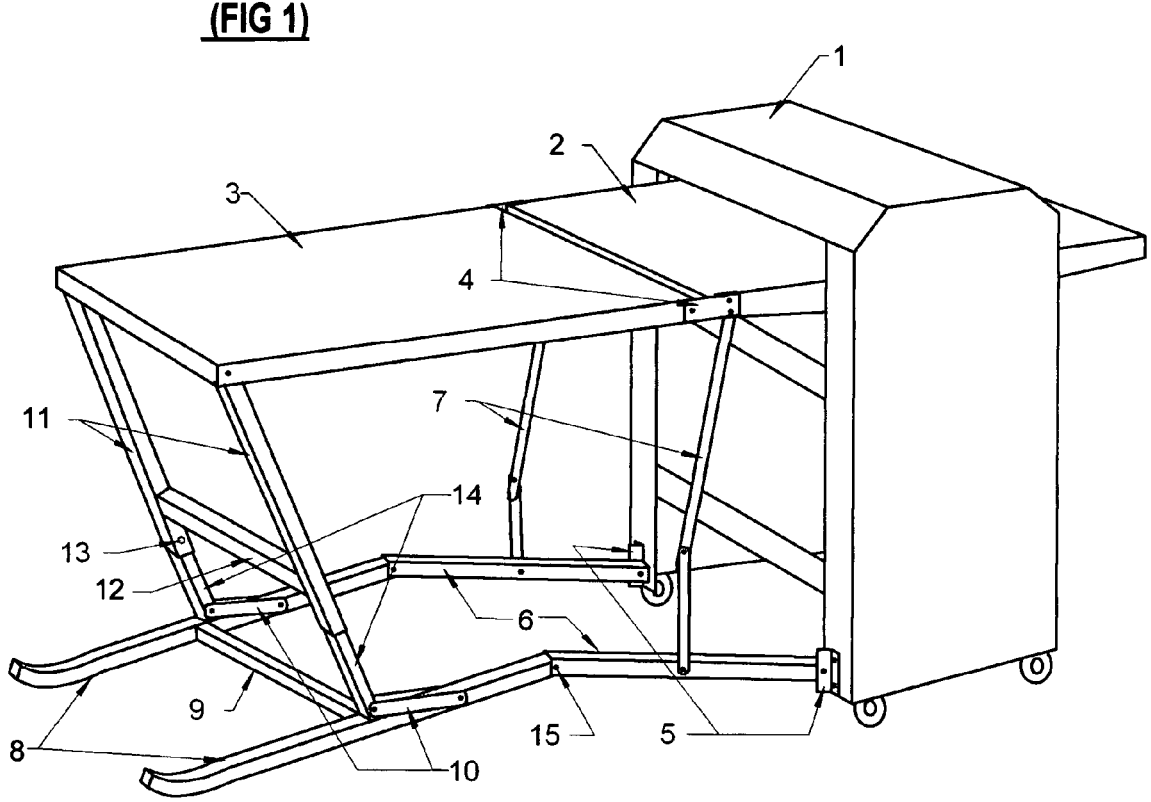
FIG. 1 shows a three dimensional drawing of the extension table apparatus attached to the adjustable bed of a planer.

Referring to FIG. 1, the embodiment contains a frame supported planer with mobile base, to which the extension table apparatus is attached. The apparatus consists of three main sections, the extension table, the leveling assembly with inner and outer sections, and the leg assembly. The planer 1 has a bed 2 with adjustable height to which is attached the extension table 3 using a pair of mounting brackets 4. These brackets are preferably bolted or clamped rigidly to the planer bed 2, and are pivotally attached to both sides of the proximal end of the extension table 3 preferably being loosely bolted so as to permit the table to rotate upward or downward.

The leveling assembly extends beneath the extension table 3. A pair of lower mounting brackets 5 are preferably bolted to each side of the lower base of the planer 1. These brackets 5, preferably made of folded metal, properly locate and provide pivotal attachment for the proximal end a pair of leveling rails 6. Lifting arms 7 pivotally connect, preferably to the upper mounting brackets 4, and extend to the leveling rails 6, attaching pivotally at a determined location near the midpoint of the length of each leveling rail 6. Each lifting arm 7, preferably made of rigid metal, consists of two sections of determined length, pivotally connected together to allow for folding of the apparatus. The upper section of each lifting arm 7 has a stop, preferably a small fold, on the lower end, to maintain a slight "knee" position between the two sections of the lifting arm 7. This positions the arm for the folding procedure while still providing the lift for the leveling rails 6. The lifting arms 7, at each point of attachment, are preferably loosely bolted to permit pivoting action. The lifting arms 7 support the leveling rails 6, raising and lowering them in the auto-leveling action. The leveling rails 6, together with the lifting arms 7, comprise the inner section of the leveling assembly.

The distal end of each leveling rail 6 is attached pivotally to the proximal end of a support rail 8. The leveling rails 6 are preferably made of sheet metal, folded to form a C-channel with the width slightly larger than the outside width of the support rails 8. The support rails 8 are connected together with a cross support 9 preferably welded to each support rail 8 at the approximate center of its length to provide stability and rigidity to the apparatus. The distal ends of the support rails 8 are preferably bent, with a determined radius, to permit portability of the apparatus and sliding movement as the planer bed 2 moves up or down. The support rails 8 and cross support 9 are preferably made of square metal tubing and make up the outer section of the leveling assembly. The length of the support rails 8 are approximately one half the distance from the distal end of the extension table to the planer, and approximately equal in length to the leveling rails 6.

A leg assembly supports the distal end of the extension table 3. The leg assembly is comprised of a pair of legs 11 with a cross support 12 preferably welded between the two legs 11, all preferably made of square metal tubing. Each leg has a telescoping leg end 14, extending downward, made preferably of square metal tubing of slightly smaller dimension, with locking device, preferably a locking bolt 13 which tightens against the telescoping leg end 14 as it slides into the leg 11. The leg assembly is of sufficient strength to support the distal end of the extension table 3 and workpiece and of sufficient length to elevate the distal end of the extension table 3 to the height of the planer bed 2. The upper end of each leg 11 is pivotally attached, preferably loosely bolted to a side of the distal end of the extension table 3. The lower telescoping leg ends 14 are pivotally attached, preferably loosely bolted, to one end of a pair of folding arms 10, which have the other ends pivotally attached on each side of the support rails 8 at a point midway between the cross support 9 and proximal end of the support rails 8. The folding arms 10, preferably made of flat metal, position the telescoping leg ends 14 to rest at the approximate center of the length of the support rails 8. The folding arms 10 also rotate to position the telescoping leg ends 14 to a second location for folding of the apparatus.

OPERATION OF THE INVENTION

1. Auto-Leveling Action

Figure 2:
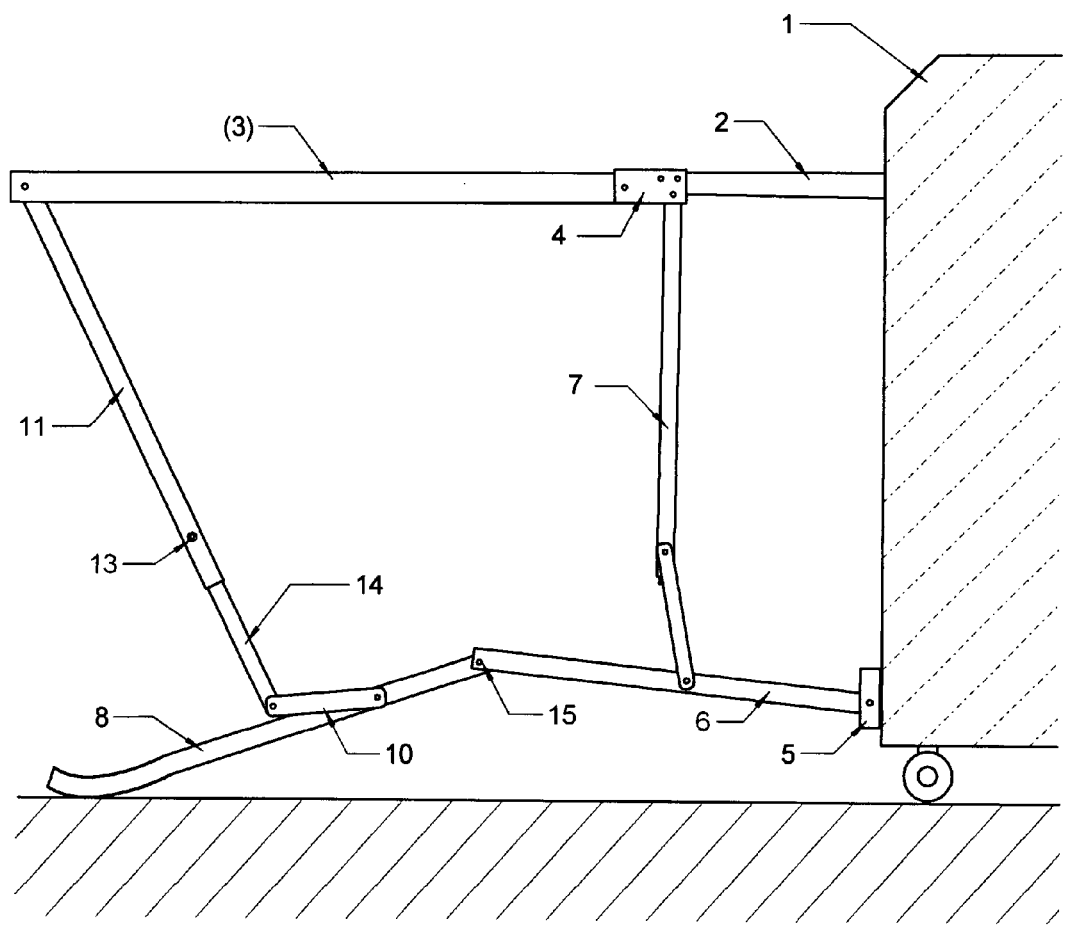
FIG. 2 is a side elevation of the apparatus attached to a planer.
Figure 3:
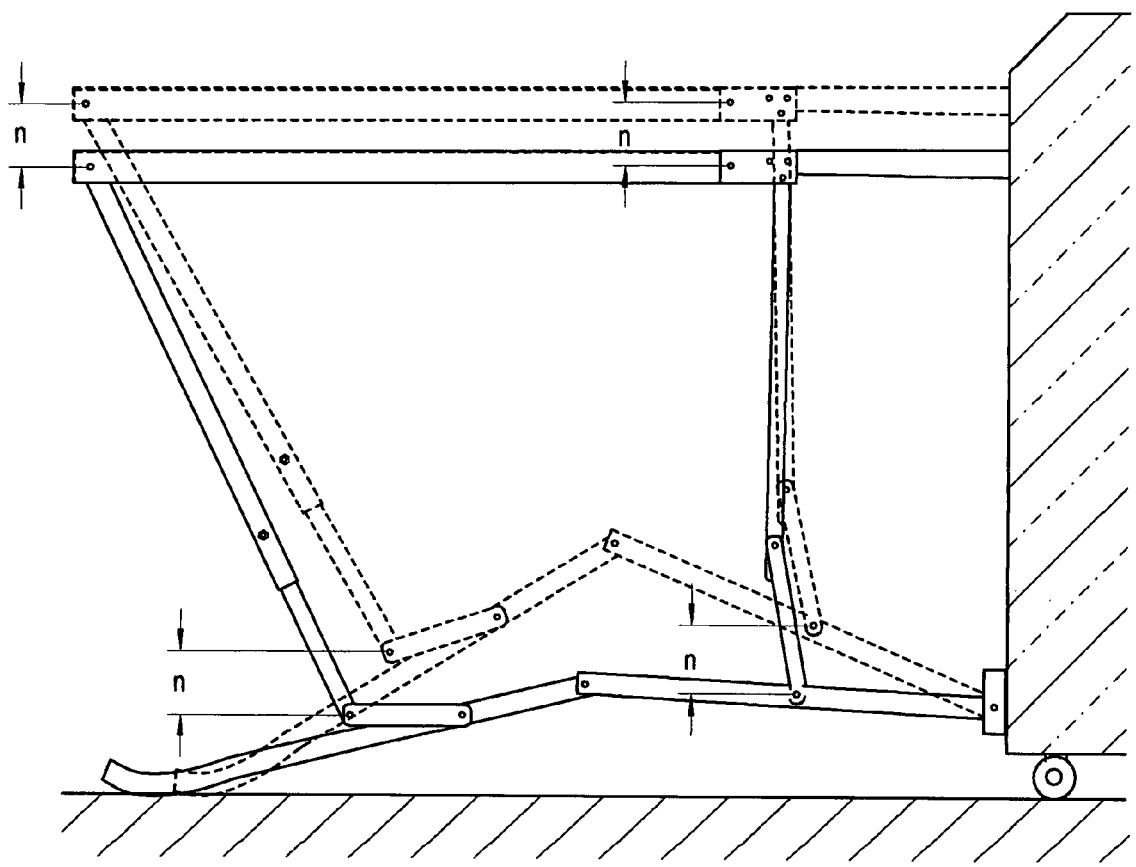
FIG. 3 shows the apparatus in two positions demonstrating how the components work to raise the extension stand keeping it in the same plane with the planer bed.

When attaching the apparatus to a machine, an initial height adjustment must be made to level the extension table 3 with the planer bed 2. This is done by loosening the locking bolt 13 on each leg 11 and sliding the telescoping leg end 14 until the distal end of the extension table 3 is level with the planer bed 2, and then tightening the locking bolt 13. One end of the extension table 3 is attached with a top mounting bracket 4 to the surface of a machine or other equipment that has height adjusting capabilities. The leveling rails 6 are attached to the base of the machine or to a part of the machine that remains stationary as the height is adjusted. Lifting arms 7 connect the approximate midpoint of the leveling rails 8 to a convenient point on the adjustable surface, preferably to the top mounting bracket 4 as shown in FIG. 2. When the planer bed 2 is raised or lowered, the lifting arms 7 cause the midpoint of the leveling rails 6 to be raised or lowered the same distance. This in turn raises the attached end of the support rails 8 causing them to pivot on the floor or ground. As this motion takes place, the leg assembly, with lower ends of the telescoping leg ends 14 situated at the approximate midpoints of the support rails 8, are raised or lowered, causing the non-attached end of the extension table 3 to be raised or lowered a distance that matches the attached end of the extension table 3 thus keeping the extension table 3 automatically level and in the same plane with the planer bed 2, as shown in (FIG. 3). Three factors affect the rate at which the non-attached end is raised: (a) The length of the leveling rails 6 in relation to the length of the support rails 8. (b) The location of the pivot point at which the lifting arms 7 are attached to the leveling rails 6 in relation to the location at which the telescoping leg ends 14 rest on the support rails 8. (c) The radius of the curved ends of the support rails 8. By adjusting each of these factors, a precise rate of movement can be achieved to match the change in height of the attached end of the table. FIG. 3 demonstrates the changes that take place as the planer bed 2 is raised a typical distance, showing how the leveling assembly is repositioned to raise the distal end of the extension table 3 the same distance as well.

2. Weight Transfer

In the case of a planer when heavy and/or long pieces of lumber are passed through the machine, the extension table 3 provides supplemental support of the weight transferring it to the floor or ground. As the workpiece moves toward the distal end of the extension table 3, more and more of the weight begins to transfer to the leg assembly which in turn distributes the weight to the outer section of the leveling assembly. The support rails 8 then transfer most of the weight to the floor or ground and the remainder of the weight is transferred to the inner section of the leveling assembly and back to the base of the machine, thus relieving the planer bed 2 from bearing the weight of the workpiece.

3. Folding Action

The components of the extension table apparatus are designed to permit the folding of the unit for storage. FIG. 4 demonstrates the action that begins the folding sequence. The non-attached end of the extension table 3 when lifted by hand, causes the folding arms 10 to pivot on the support rails 8. The folding arms 10 pivot toward the hinge point 15 causing it to lift toward the attached end of the extension table 3. The two-pieced design of the lifting arms 7 permit the leveling rails 6 to be raised without interference. As the non-attached end of the extension table 3 is lowered, the hinged end of the support rails 8 and leveling rails 6 are rotated upward along with the telescoping leg ends 14 and folding arms 10, allowing the extension table 3 to fold downward to a folded position as shown in FIG. 5. To unfold the apparatus, the non-attached end of the extension table 3 is lifted, and the support rails 8 begin to extend outward under their own weight, extending to rest on the floor being held by the lifting arms 7. The folding arms 10 pivot outward positioning the telescoping leg ends 14 onto the support rails 8 returning the extension table apparatus to its original operating position.

Thus is presented an extension table apparatus comprising components with structural integrity, simple in design, readily attached to a number of pieces of equipment, easily reproduced and manufactured. It is to be understood that the above-referenced arrangements are only illustrative of the application of the present invention. Numerous modifications and alternative arrangements may be devised without departing from the spirit and scope of the present invention as defined in the appended claims.

I claim:

1. A height adjustable apparatus for supporting a work piece, attachable to a machines having an adjustable height work surface comprising:
   (a) an extension table having a proximal end and a spaced-apart distal end, wherein the proximal end is pivotally attached to the adjustable-height work surface;
   (b) a leveling assembly having an inner section proximal to said machine base and having a pair of leveling rails pivotally connected to said machine base and an outer section distal to said machine base having a pair of support rails extending laterally beneath the table and pivotally connected to the leveling rails of the inner section;
   (c) a leg assembly including an upper end pivotally connected to and supporting the distal end of the extension table and a lower end pivotally connected to the outer section of said leveling assembly;
   (d) a pair of lifting arms having a first end pivotally attached to said adjustable-height work surface near the extension table and a second end pivotally connected to the inner section of said leveling assembly; and
      wherein the leveling assembly supports and maintains the height of the extension table in substantial planar alignment with the adjustable height work surface of the machine.

2. The apparatus of claim 1, wherein said leg assembly further comprises a pair of spaced apart legs with at least one cross support, and wherein each leg has a telescoping end pivotally connected to said outer section of said leveling assembly and a releasable locking device for establishing and maintaining an initial height setting, and wherein the initial height adjustment is accomplished by releasing the locking device, sliding the telescoping end of each leg to a position where the extension table is level with the adjustable-height work surface and fastening the locking device in place.

3. The apparatus of claim 1 wherein the support rails each have a curved distal end and a spaced apart proximal ends which are connected to the leveling rails of the inner section.

4. The apparatus of claim 3 wherein the proximal ends of the support rails are fastened near the distal end of the leveling rails of the inner section.

5. The apparatus of claim 1 wherein cooperation of the lifting arm pivots, leg assembly pivots and leveling assembly pivots allow the extension table to fold generally downward respective the adjustable height work surface for compact storage.

* * * * *